(12) United States Patent
Gaskill

(10) Patent No.: US 7,800,892 B2
(45) Date of Patent: Sep. 21, 2010

(54) ERGONOMIC VISUAL DISPLAY SYSTEM

(75) Inventor: Braddock C. Gaskill, Silver Spring, MD (US)

(73) Assignee: Dockside Vision, Inc., Baltimore, MD (US)

( * ) Notice: Subject to any disclaimer, the term of this patent is extended or adjusted under 35 U.S.C. 154(b) by 498 days.

(21) Appl. No.: 11/811,973

(22) Filed: Jun. 13, 2007

(65) Prior Publication Data

US 2008/0002344 A1    Jan. 3, 2008

Related U.S. Application Data

(60) Provisional application No. 60/813,749, filed on Jun. 14, 2006.

(51) Int. Cl.
*G06F 1/16* (2006.01)

(52) U.S. Cl. .................. 361/679.04; 345/156; 248/917; 717/100

(58) Field of Classification Search .................. 345/1.1, 345/156, 157; 717/100; 455/573.3; 248/917–924, 248/288.51; 361/679.01, 679.06, 679.21, 361/679.27

See application file for complete search history.

(56) References Cited

U.S. PATENT DOCUMENTS

| | | | | |
|---|---|---|---|---|
| 2005/0114825 | A1* | 5/2005 | Leung et al. | 717/100 |
| 2006/0197714 | A1* | 9/2006 | Chang | 345/1.1 |
| 2008/0070644 | A1* | 3/2008 | Park et al. | 455/575.3 |
| 2008/0247128 | A1* | 10/2008 | Khoo | 361/681 |

\* cited by examiner

*Primary Examiner*—Hung V Duong
(74) *Attorney, Agent, or Firm*—General Counsel, P.C.

(57) ABSTRACT

An ergonomic visual display system having two video display screens, one located immediately beneath the other. The video display screens each rotate to accommodate an acute configuration with respect to a user's vision. The means for rotating the screens may involve a rotating attachment between screens, or involve a rotating attachment to a stand.

14 Claims, 5 Drawing Sheets

ERGONOMIC VISUAL DISPLAY SYSTEM

CROSS-REFERENCE TO RELATED APPLICATIONS

The present application claims the benefit of U.S. provisional application Ser. No. 60/813,749 titled Multiple Document Viewing System and User Interface, filed Jun. 14, 2006 and is incorporated herein by reference in its entirety.

FIELD OF THE INVENTION

The present invention relates to the field of visual ergonomics and more specifically to the field of electronic visual display arrangements and interfaces.

BACKGROUND

There are multiple professions that require the presence of multiple sets of documents before a skilled reviewer. This review professional will examine one document or image and then turn to a second document or image to compare or contrast the differences. This action can be found throughout industries where important statements or visual representations comprise independent legal or functional significance; e.g. contract reviewers, architects, computer programmers, etc.

There is, however, great discomfort in repeatedly swiveling one's neck from side to side to view either multiple documents or multiple computer screens. Therefore, there is a need for single apparatus capable of comfortably allowing document and image comparisons with an input mechanism adapted to maintain a user's comfort.

SUMMARY

The present invention is directed to an ergonomic visual display system comprised of multiple embodiments. In a first embodiment, the present invention includes a first video display connected to a second video display by a stand. The stand positions the second video display beneath the first video display. Both the video displays are connected to an arithmetic logic unit (ALU), e.g. a computer, that sends information to the video displays. An input system, e.g. a keyboard, allows a user to send data to the ALU, which is then fed to one or both of the video displays.

A preferred version of the stand may include a first support member attached to a body of the first video display, and a second support member attached to a body of the second video display. Embodiments of the present invention that have video display screen bodies that fold one upon the other preferably utilize curved support members. The attachment may be a rotating attachment to allow adjustment of the visual display screens.

A preferred input mechanism of the present invention includes a bifurcated keyboard, which allows high level volumes of data input to the ALU while continuing to maintain the comfort aspects of the present invention. It is preferred that the bifurcated keyboard be positioned peripherally around the video display bodies such that the video displays can be positioned in near proximity to a user. A second input mechanism further achieving the aspects of the present invention includes a touchscreen panel located on one of the video display screens, preferably the lower video display screen.

A second embodiment of the ergonomic visual display system of the present invention includes a unitary system with a single body foldable along an axis. On the interior of the body are formed two surfaces, a first surface containing the first video display and a second surface containing the second video display. The system may further include a stand attached to the body. The preferred stand includes a rotatable support member attached to the body, either distally to the first video display screen or the second video display screen. The stand may also include the preferred stand having a first support member attached distal to the first video display, and a second support member attached distal to the second video display. The attachment may be a rotating attachment to allow adjustment of the visual display screens.

A third embodiment of the ergonomic visual display system includes the first video display contained with a body and the second video display within a body. The second video display is positioned proximately beneath the first video display such that a portion of the second video display body is directly beneath a portion of the first video display body. A stand is further included that has a first support member rotatably affixed to the first video display body, and a second support member, rotatably affixed to both the first support member and the second video display body.

Each of the disclosed embodiments may include the input mechanisms of the present invention, or integrated or distant ALU.

The dual, "over-under" display configuration has significant usability and ergonomic advantages over other display arrangements. The over-under display configuration makes this large display accessible, comfortable, and intimate to the user. In the more traditional side-by-side dual-head configuration that is common today, the user's display is divided down the middle, forcing the user to crane their neck to the left or right to view one or the other display. The invention allows uninterrupted viewing in the center of the user's field of view on the top screen, while also offering the lower, angled "draftsman table" screen for a relaxed book-reading posture. The interface utilizes the user's innate spatial reasoning in research tasks. This screen real estate is provided in a very human-scale configuration that easily fits on a typical desk.

The "draftsman table" lower screen brings the information physically closer to the user, invoking a stronger spatial sense in the user. The lower screen may optionally be a touch screen, so the user can simply manipulate the information. The touch screen interface again reinforces the present invention's holistic emphasis on invoking spatial intuition in the end user. While the display can certainly be used with a conventional keyboard, a split keyboard configuration offers significant advantages to the touch typist, and offers the user an easy adjustment. In addition to allowing the user to be nearer the displays, the invention embodiments utilizing the split keyboard promotes a healthy neutral arm and wrist position, with the user's arms spread to the side of the display.

Therefore, it is an aspect of the present invention to diminish the muscular strain involved in document drafting, comparison, and evaluation.

It is a further aspect of the present invention to present a document/image review system minimizing space necessary to perform the review functions.

It is a still further aspect of the present invention to minimize the time involved in document drafting, comparison, and evaluation.

These aspects of the invention are not meant to be exclusive. Furthermore, some features may apply to certain versions of the invention, but not others. Other features, aspects, and advantages of the present invention will be readily appar-

DETAILED DESCRIPTION

Figure 1:
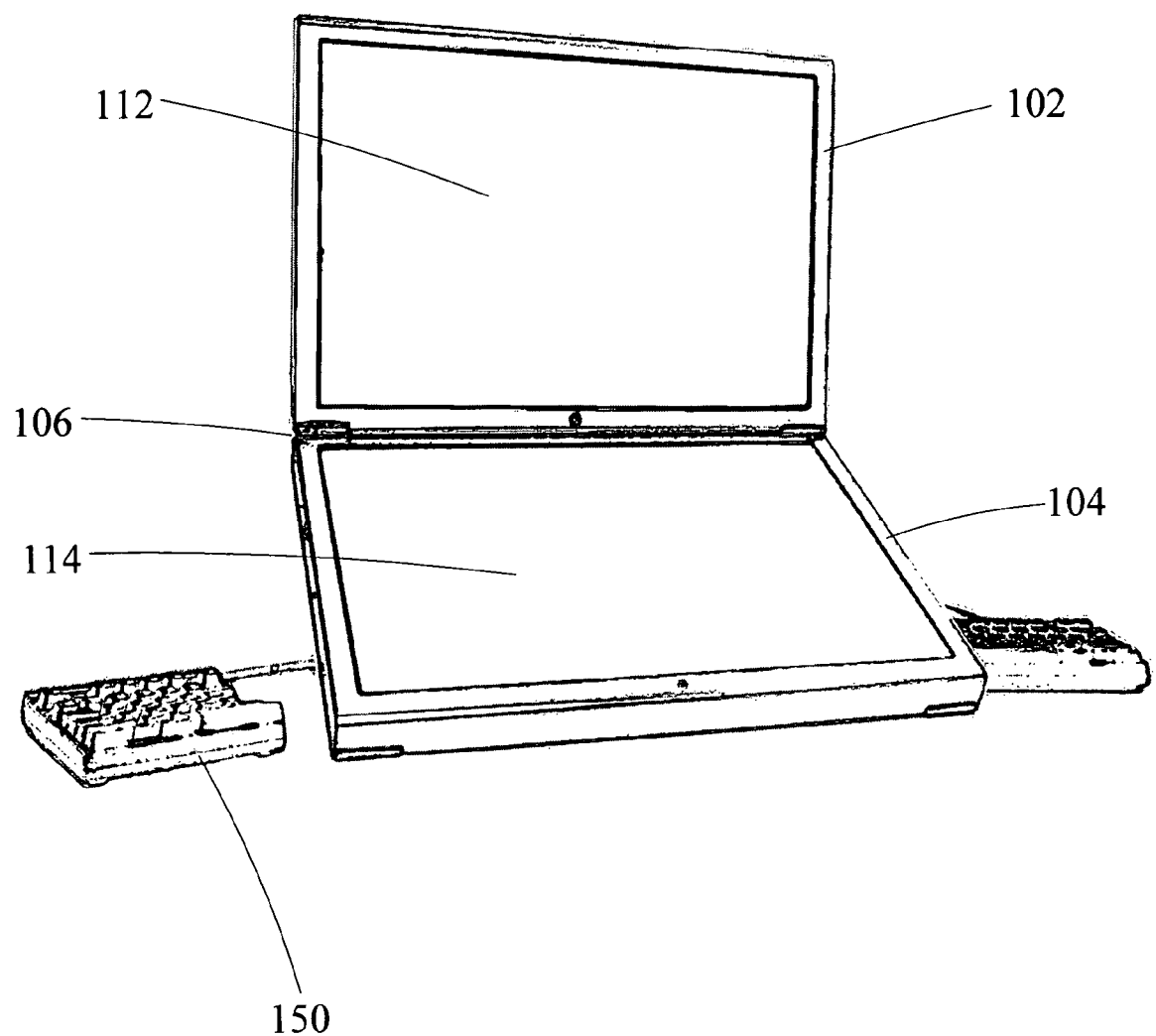
FIG. 1 is a perspective view of the ergonomic visual display system.

Referring first to FIG. 1, a basic embodiment of the unitary ergonomic visual display system 100 of the present invention is shown. The unitary system 100 includes unitary segmented into two joined portions: a first body 102 and a second body 104. The first body 102 and the second body 104 attached via one or more hinges 106 that allow the first body 102 to axially rotate toward, and away from, the second body 104. By unitary it is meant that the first body 102 is directly connected to the second body 104, rather than, or in addition to, other means of connection and support.

Within the first body 102 is positioned on its interior surface a first video display screen 112. Similarly, a second video display 114 is positioned within the second body 104. In the unitary system embodiment 100 of the present invention, the first video display screen body 102 is positioned directly above, and substantially flush with the, second video display screen body 104. It is preferred that in the present invention, a flat screen display is used. In one embodiment, the computer displays of the present invention comprise APPLE cinema displays. The APPLE cinema displays are available in 20-inch, 23-inch, and 30-inch sizes. Upon closing the screens one upon the other, it is preferred that no portion of either video display screen be exposed to the exterior environment.

The present invention may further include the accessories with which a computer display screen may operate. The present invention may include an arithmetic logic unit (ALU) connected thereto, or the ALU may be incorporated physically within the system. As a means of input, the present invention may include any of the devices known in the computer arts, e.g. mouse, keyboard, joystick, rollerball, etc. It is preferred, however, that a split keyboard be used with the present invention. In addition to allowing the user to be nearer the displays, the invention embodiments utilizing the split keyboard promotes a healthy neutral arm and wrist position, with the user's arms spread to the side of the display. Examples of keyboards amenable to the present invention include: GOLDTOUCH split keyboards, ACER FUTURE KEYBOARD, ADDESSO, CIRQUE WAVE KEYBOARD, FOUNTAIN, KINESIS, MICROSOFT NATURAL KEYBOARD, MINIERGO, THE MYKEY, and SMARTBOARD.

Figure 2:
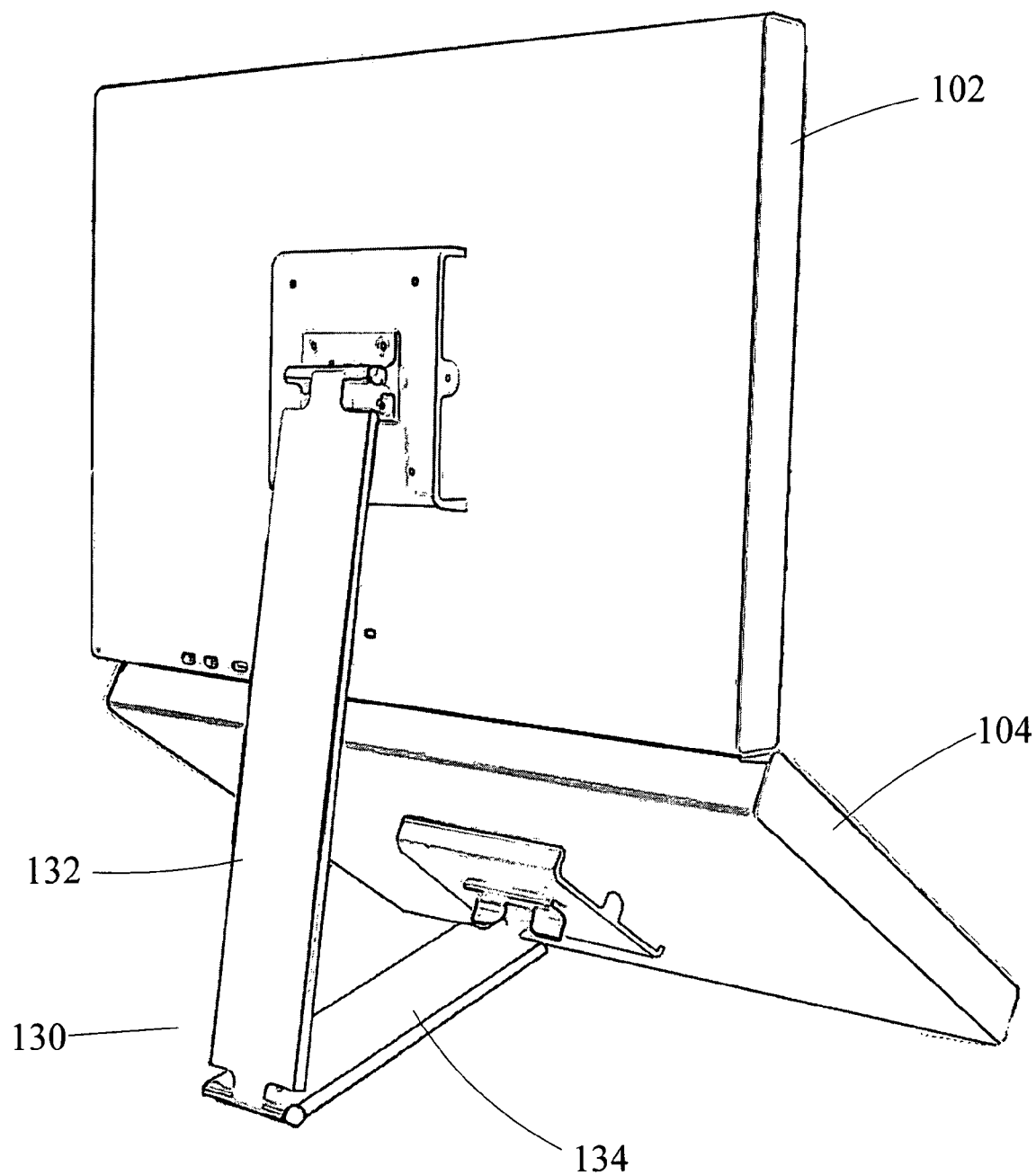
FIG. 2 is a perspective, rear view of the ergonomic visual display system.
Figure 3:
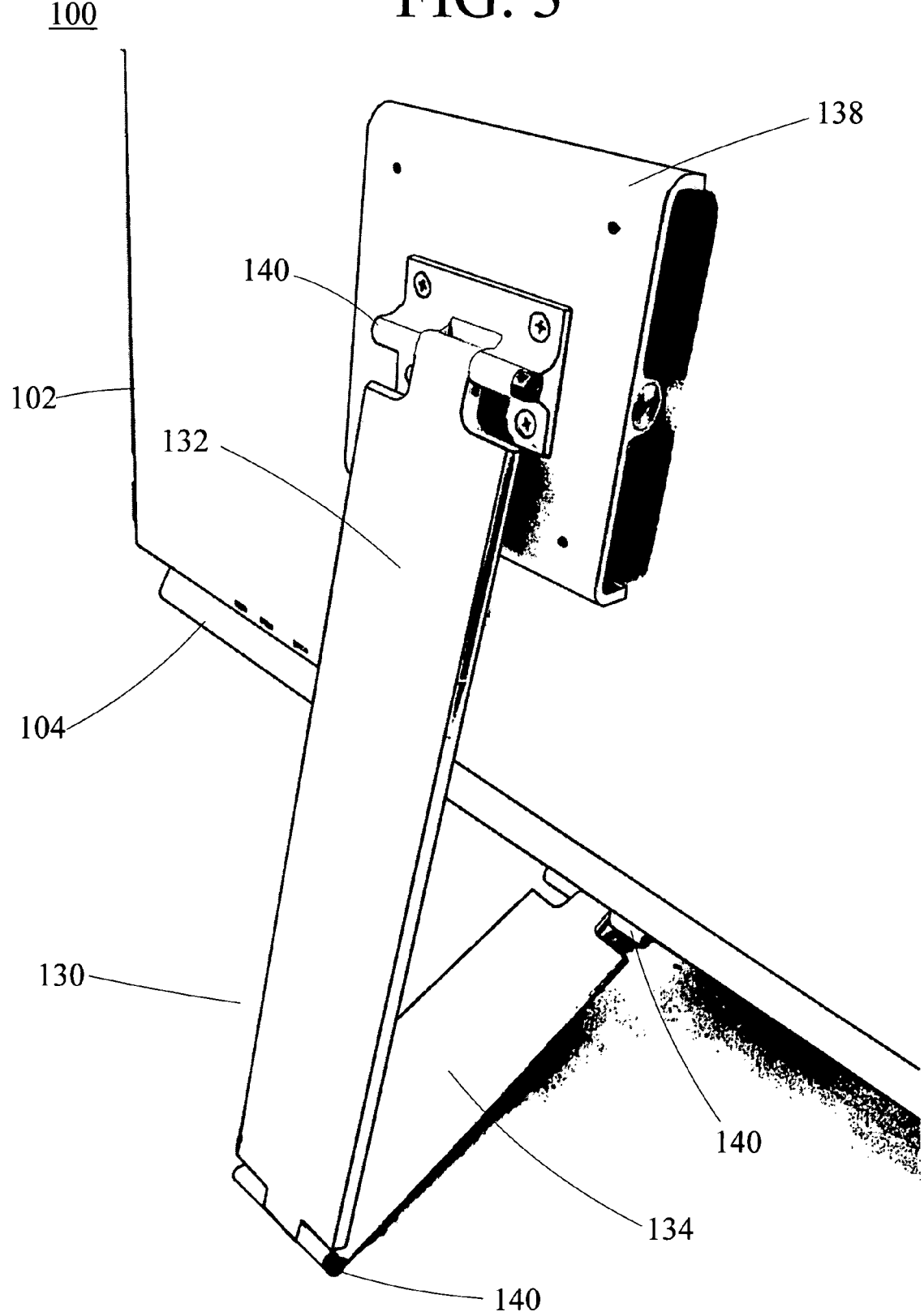
FIG. 3 is a perspective view of a support member of the present invention.
Figure 4:
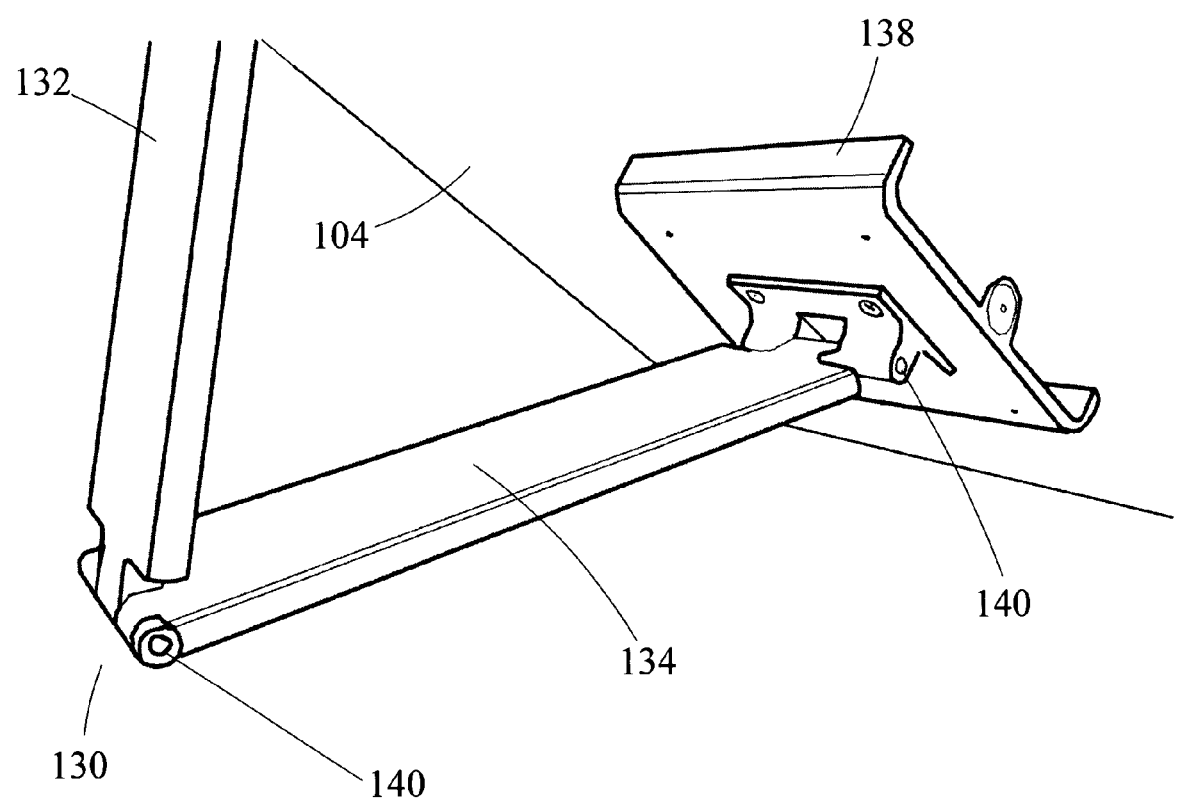
FIG. 4 is a perspective view of a support member of the present invention.

As FIG. 2 illustrates, any system of the present invention may further include a stand 130 attached thereto. In embodiments of the system lacking support between the first body 102 and the second body 104 (e.g. a hinge), the stand 130 will be a necessary component—absent an additional, external support component. The stand 130 includes a rotatable support member attached to the body, either distally to the first video display screen or the second video display screen. The preferred stand includes a first support member 132 attached distally to the body 102 of the first video display (not shown), and a second support member 134 attached distally to the body 104 of the second video display (not shown). As shown in greater detail in FIGS. 3 and 4, the attachment may include one or more rotating attachments to allow simple adjustment of the visual display screens. However, in any portion of the present invention the joints may include static connectors rather than rotatable connectors; rotatable connectors enhance the mobility of the present invention but are not intended to be the sole means of connection between two components of the present invention.

A preferred stand 130 configuration includes two attachment plates 138 attached distally to each video display screen. A support member connects to each attachment plate, shown in FIG. 3 a first support member 132 and a second support member 134. The first support member 132 is connected to the second support member 134. In the support member-support member connection and the two support member-attachment plate connections, it is preferred that a rod-and-sleeve hinge 140 be used to allow circular rotation about the connection points. However, a static connection will sometimes be preferred in this position. The rod-and-sleeve preferably maintains a tight fit that allows significant frictional resistance to motion to maintain display screen positions in circumstances absent external physical urging.

Figure 5:
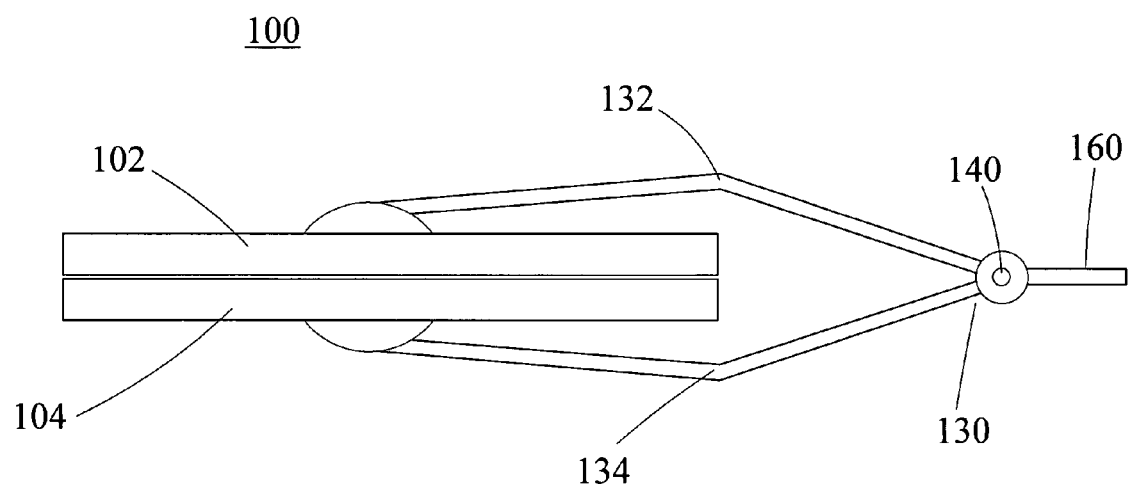
FIG. 5 is a side, plan view of the ergonomic visual display system.
Figure 6:
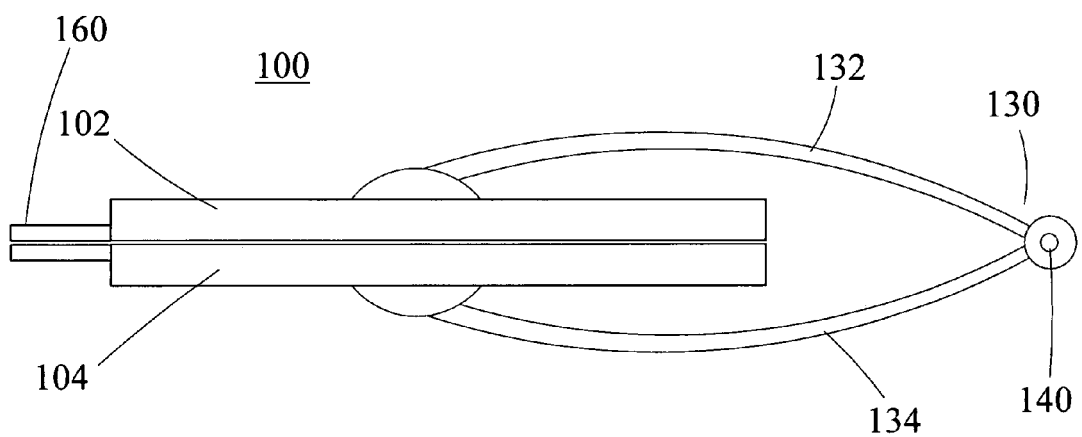
FIG. 6 is a side, plan view of the ergonomic visual display system.

Turning now to FIGS. 5 and 6, embodiments of the present invention may include support members, shown as a first support member 132 and a second support member 134, that rotatably connect to the a video display body, shown as first body 102 and second body 104. Furthermore, the first support member 132 may rotatably connect to the second support member 134 via a rotating connector, shown as a rod-and-sleeve joint 140. For distally-connected, dual-support member rotating stand embodiments such as those illustrated in FIGS. 5 and 6, it is necessary that the support members define a space suitable for the bodies to occupy. FIG. 5 illustrates a discretely curved first support member 132 and second support member 134; FIG. 6 illustrates a gradually curved first support member 132 and second support member 134. Curved support members allow the video display screens to fold completely one upon the other by using only two support members. In instances with three or more support members, such curvature is often unnecessary. Yet other embodiments which enable the two screens to be folded together may do so by using straight member-supports, but locating the rotatable joints by which the straight member-supports connect to the two video display screens offset from the flat back, or the periphery, of the video display screen body in order to provide the necessary clearance.

In folding embodiments of the present invention, a handle 160 may be affixed to either or both of the first body 102 or second body 104; or the handle 160 may be affixed to the stand 130. In embodiments of the present invention where the handle 160 is affixed to the stand, it is preferred that the handle be attached to the intersection of two support members. Alternatively, in embodiments of the present invention, the first support member and second support member may each be split into two or more branches that form an interior void dimensioned to accept a user's hand. The branched support members would include an interior joint that runs between branched support members, and this joint would operate as a handle. Other embodiments of the present invention will utilize removable video display screen bodies that attach via a VESA mount.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. An ergonomic visual display system comprising:
   a first video display having a body;
   a second video display having a body, positioned proximately beneath said first video display such that a portion of said second video display body is directly beneath a portion of said first video display body;
   a stand contacting both said first video display body and said a second video display body;
   a computer in signaled communication with both said first video display and said second video display; and
   a bifurcated keyboard, adapted to peripheral positioning, in signaled communication with said computer.

2. The system of claim 1 wherein said stand comprises a first support member rotatably affixed to said first video display body; and a second support member, rotatably affixed to both said first support member and said second video display body.

3. The system of claim 2 wherein said first video display body is removably affixed to said first support member, and said second video display body is removably affixed to said second support member.

4. The system of claim 1 wherein said stand comprises a first support member statically affixed to said first video display body; and a second support member, rotatably affixed to said first support member and statically affixed to said second video display body.

5. The system of claim 1 wherein said first support member comprises two or more first support member branches; said second support member comprises two or more second support member branches; and a handle is positioned between at least two of said first support member branches and at least two of said second support member branches.

6. A unitary ergonomic visual display system comprising:
   a display unit foldably bifurcated into a first body with a first video display and a second body with a second video display;
   a stand with a curved first support member rotatably affixed to said first video display body, and a curved second support member, rotatably affixed to both said first support member and said second video display body; and
   a handle affixed to said stand.

7. The system of claim 6 further comprising a stand with a rotatable support member affixed to said display unit.

8. The system of claim 7 wherein said rotatable support member is affixed to said first body distally from said first video display.

9. The system of claim 7 wherein said rotatable support member is affixed to said second body distally from said second video display.

10. The system of claim 6 further comprising a stand consisting of a curved first support member rotatably affixed to said first video display body; and a curved second support member, rotatably affixed to both said first support member and said second video display body.

11. The system of claim 6 wherein said first support member comprises two or more first support member branches; said second support member comprises two or more second support member branches; and said handle is positioned between at least two of said first support member branches and at least two of said second support member branches.

12. An ergonomic visual display system comprising a first video display having a body;
   a second video display having a body, positioned proximately beneath said first video display such that a portion of said second video display body is directly beneath a portion of said first video display body; and
   a stand comprising a first support member rotatably affixed to said first video display body; and a second support member, rotatably affixed to both said first support member and said second video display body,
   a computer in signaled communication with both said first video display and said second video display; and
   an input system in signaled communication with said computer, wherein said first video display body is removably affixed to said first support member, and said second video display body is removably affixed to said second support member.

13. The system of claim 12 wherein said input system includes a bifurcated keyboard adapted to peripheral positioning.

14. The system of claim 13 wherein said input system includes touchscreen means on said second video display.

* * * * *